3,544,549
DISPERSE DYES OF THE AZOBENZENE SERIES
Ruedi Altermatt, Tecknau, Basel-Land, and Curt Mueller, Basel, Switzerland, assignors to Sandoz Ltd. (also known as Sandoz A.G.), Basel, Switzerland
No Drawing. Filed July 31, 1967, Ser. No. 657,009
Claims priority, application Switzerland, Aug. 12, 1966, 11,682/66
Int. Cl. C07c *107/06;* C09b *29/24*
U.S. Cl. 260—207                                    10 Claims

ABSTRACT OF THE DISCLOSURE

This invention relates to dyes of the 4-nitro-2′-acylamino-4′-dialkylamino-5′-alkoxy-1,1′ - azobenzene series which are substituted by at least one formyloxy group and have high affinity from aqueous dispersion for textiles made of synthetic or semi-synthetic materials of hydrophobic character and high molecular weight. On these substrates the dyes give blue dyeings having excellent all-round fastness properties.

---

The new dyes are of the formula

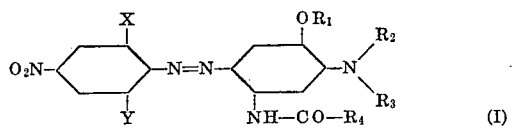

where X stands for a nitro or cyano group, Y for a chlorine or bromine atom or the nitro group, $R_1$ for a methyl or ethyl radical, $R_2$ for a β-formyloxyethyl, β- or γ-formyloxypropyl, β,γ-diformyloxypropyl, β-formyloxy-γ-chloropropyl, β-formyloxy-γ-bromopropyl or β-formyloxy-γ-cyanopropyl radical, $R_3$ for a methyl, ethyl, propyl, butyl, cyanalkyl or alkoxycarbonylalkyl group or for one of the significances of $R_2$, and $R_4$ for a hydrogen atom or an alkyl or alkoxy radical, and where the alkyl and alkoxy radicals contain 1, 2, 3 or 4 carbon atoms and may be substituted by non-water-solubilizing substituents.

The preferred substituents on the alkyl and alkoxy radicals are chlorine or bromine atoms, cyano, phenyl, phenyloxy, acetyl or benzoyl radicals.

The preferred dyes conform to the formula

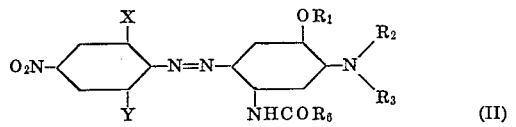

where $R_1$, $R_2$, X and Y have the meanings assigned to them in the foregoing, $R_5$ stands for an unsubstituted alkyl group having 1, 2, 3 or 4 carbon atoms, or a β-cyanethyl, β-cyanopropyl, β-methoxycarbonyl or β-(β′-methoxyethoxycarbonyl)-ethyl radical or for one of the meanings of $R_2$, and $R_6$ for a hydrogen atom, or a methyl, ethyl, propyl, methoxy, ethoxy, chloromethyl, chloroethyl, bromomethyl, bromoethyl, dichloroethyl, dibromoethyl, cyanomethyl, phenoxymethyl, β-chloroethoxy, β-bromoethoxy, benzyloxy, methoxymethyl, ethoxymethyl, acetylmethyl or benzoylmethyl group.

The dyes of Formula I, which contain one or two formyloxy groups bound through an aliphatic intermediate member to the tertiary nitrogen atom of the amino group, exhibit superior fastness to solvents and lubricants than dyes of similar constitution, for example those disclosed in French patent specification 1,261,580, in which the molecule is free from formyloxy groups.

The dyes of Formula I are produced by diazotizing an amine of formula

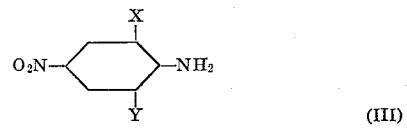

and coupling the diazonium compound with a compound of formula

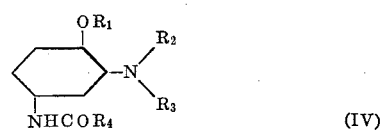

In an analogous manner the dyes of Formula II are obtained by diazotization of an amine of Formula III and coupling of the diazonium compound with a compound of formula

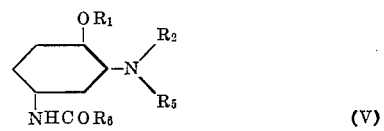

The coupling reaction is generally effected in an acid medium, which, if necessary, may be buffered to about pH 2.5 with, e.g., an alkali acetate, and is kept at low temperature, preferably 0–5° C., by cooling.

It is advantageous to convert the new dyes into dyeing preparations before application. For this purpose standard methods are employed, e.g., grinding in the presence of dispersing agents and/or filters, and the preparations are subsequently vacuum or jet dried. After the addition of an appropriate volume of water they can be dyed, padded or printed at a long or short liquor ratio as desired.

From aqueous dispersion the dyes build up excellently on textile materials of synthetic or semi-synthetic hydrophobic organic substances of high molecular weight. They are highly suitable for the dyeing and printing of textiles made of linear aromatic polyester fibres, and those of cellulose acetate or triacetate and of polyamide fibre. They are also dyeable on polyolefines, acrylonitrile polymers and polyvinyl compounds.

The known dyeing and printing methods are used, as exemplified by those described in French patent specification 1,445,371.

Blue dyeings and prints are obtained which have very good fastness properties, in particular to heat (i.e., sublimation, setting and pleating), solvents, lubricants and chlorine. The fastness to water, sea water, washing and other wet tests is also very good, while the light fastness and the reserve of wool are of a notably high standard. The dyes are extremely stable to the chemicals and conditions used in the various forms of permanent press finishing. They withstand temperatures of up to about 220° C. and in particular in the range up to 140° C. without deterioration or reduction, and they are stable to acids and alkalis within the pH range of 2 to 9. Their stability to these various agencies is not adversely affected by the liquor ratio or by the presence of dyeing accelerants.

In the examples the parts are by weight and the temperatures are in degrees centigrade.

EXAMPLE 1

6.9 parts of sodium nitrite are added with vigorous stirring to 120 parts of concentrated sulphuric acid at 60–70° and, after a further 10 minutes stirring at the same temperature, the solution is cooled to 10°. 26.2 parts of 1-amino-2-bromo-4,6-dinitrobenzene are then added for diazotization, which takes 3 hours to complete. After this time 8 parts of urea are added and stirring continued for 15 minutes at 10°. The resulting diazonium salt solution is run into a mixture of 32.4 parts of 1-ethoxy-2-N,N-di-(2'-formyloxyethyl)-amino - 4 - formylaminobenzene, 50 parts of glacial acetic acid and 200 parts of ice. The coupling reaction is terminated in acid medium by adjustment to pH 2.0–2.5 with sodium acetate. The dye forms rapidly and settles out, to be filtered off, washed free of acid and dried. On synthetic fibres it gives blue dyeings having excellent fastness properties.

EXAMPLE 2

6.9 parts of sodium nitrite are slowly added with thorough stirring to 120 parts of concentrated sulphuric acid at 60–70°, and after continued stirring for 10 minutes at 60° the solution is cooled to 10°. 26.2 parts of 1-amino-2-bromo-4,6-dinitrobenzene are added for diazotization, which is completed in 3 hours. Subsequently, 8 parts of urea are added and stirring continued for 15 minutes at 10°. The resulting diazonium salt solution is run into a mixture of 33.8 parts of 4-acetylamino-1-ethoxy-2-N,N-di-(2'-formyloxyethyl)-aminobenzene, 50 parts of glacial acetic acid and 300 parts of ice. The coupling reaction is brought to a close in acid medium, upon which the dye forms rapidly and settles out. It is filtered off, washed free of acid and dried. On synthetic fibres the dye gives blue dyeings having excellent fastness properties.

EXAMPLE 3

6.9 parts of powdered sodium nitrite are added with vigorous stirring to 120 parts of concentrated sulphuric acid at 60–70°. After continued stirring for 10 minutes at 60° and cooling to 10°, 100 parts of glacial acetic acid are added at 10–20°, followed by 26.2 parts of 1-amino-2-bromo-4,6-dinitrobenzene and 100 parts of glacial acetic acid. Stirring is continued for 3 hours at 10–15°, after which the diazonium salt solution formed is run into a mixture of 30.5 parts of 1-ethoxy-2-N-(2'-cyanethyl)-N-(2'-formyloxyethyl)-amino-4-formylaminobenzene, 100 parts of glacial acetic acid, 200 parts of ice and 10 parts of aminosulphonic acid. The coupling reaction is completed in acid medium by adjustment to pH 2.0–2.5 with sodium acetate. The dye forms immediately and settles out, to be filtered off, washed free of acid and dried. This dye gives dyeings of blue shade on synthetic fibres with excellent fastness properties.

DYEING EXAMPLE 1

A fine dye powder is prepared by grinding in a ball mill for 48 hours a mixture of 7 parts of the dye obtained as detailed in Example 1, 4 parts of sodium dinaphthylmethane disulphonate, 4 parts of sodium cetyl sulphate and 5 parts of anhydrous sodium sulphate. 3.5 parts of the preparation are dispersed with a small volume of water and the dispersion is added through a sieve to 4000 parts of water containing 2 parts of sodium lauryl sulphate to form the dyebath. The goods to liquor ratio is 1:40 in this particular case, but it may vary within wide limits. 100 parts of a scoured fabric of "Dacron" (registered trademark) polyester fibre are entered into the dyebath at 40–50°, after which 20 parts of an emulsion of a chlorinated benzene in water are added. The bath is raised slowly to 100° and held for 1–2 hours at 95–100°, after which time the fabric, which is dyed navy blue, is removed, rinsed, soaped, rinsed again and dried. The level dyeing is fast to light, cross dyeing, washing, sea water, perspiration, sublimation, burnt gas fumes, thermofixation, pleating and solvents.

DYEING EXAMPLE 2

A mixture of 40 parts of the dye obtained as given in Example 1, 55 parts of sulphite cellulose waste lye and 800 parts of water is ground in a ball mill until the dye particles are less than 1 micron in size. The colloidal solution thus formed is mixed with 25 parts of butyl glycol ether and 400 parts of 6% carboxymethyl cellulose. The paste thus obtained is highly suitable for the melange or Vigoureux printing of "Diolen" (registered trademark) polyester slubbing. This material is printed with two rollers giving a coverage of 78% and is steamed at 120° without intermediate drying. Blue prints with good fastness properties are obtained.

The dyes particularized in the following table are produced in accordance with the procedure of Example 1 from a diazotized amine of Formula III and a compound of Formula IV. They give dyeings of blue shade on polyester materials.

| Example No. | X | Y | $R_1$ | $R_2$ | $R_3$ | $R_4$ |
|---|---|---|---|---|---|---|
| 4 | $-NO_2$ | $-Cl$ | $-CH_3$ | $-CH_2CH_2OCHO$ | $-CH_2CH_2OCHO$ | $-CH_3$ |
| 5 | Same | $-Cl$ | $-CH_2CH_3$ | Same as above | Same as above | Same as above. |
| 6 | do | $-Cl$ | Same | do | do | H |
| 7 | do | $-Cl$ | $-CH_3$ | do | do | H |
| 8 | do | $-Br$ | Same | do | do | do |
| 9 | do | $-Br$ | do | do | do | $-CH_3$ |
| 10 | do | $-Br$ | do | do | do | $-CH_2CH_3$ |
| 11 | do | $-Br$ | do | do | do | $-OCH_3$ |
| 12 | do | $-Cl$ | do | do | do | Same as above. |
| 13 | do | $-Cl$ | $-CH_2CH_3$ | do | do | Do. |
| 14 | do | $-Br$ | Same | do | do | Do. |
| 15 | do | $-Br$ | $-CH_3$ | do | do | Do. |
| 16 | do | $-Br$ | Same | do | do | $-OCH_2CH_3$ |
| 17 | do | $-Cl$ | do | do | do | Same as above. |
| 18 | do | $-Br$ | do | do | do | $-OCH_2CH_2Cl$ |
| 19 | do | $-Br$ | $-CH_2CH_3$ | do | do | Same as above. |
| 20 | do | $-Cl$ | Same | do | do | Do. |
| 21 | do | $-Cl$ | do | do | do | $-OCH_2-C_6H_5$ |
| 22 | do | $-Br$ | do | do | do | Same as above. |
| 23 | do | $-Br$ | $-CH_3$ | do | do | H |
| 24 | do | $-Cl$ | Same | do | $-CH_2CH_2CN$ | H |
| 25 | do | $-Cl$ | do | do | Same as above | $-CH_3$ |
| 26 | do | $-Br$ | do | do | do | Same as above. |
| 27 | do | $-Br$ | do | do | do | H |
| 28 | do | $-Cl$ | do | do | do | H |
| 29 | do | $-Cl$ | do | do | do | $-CH_3$ |
| 30 | do | $-Br$ | do | do | do | Same as above. |
| 31 | do | $-Br$ | do | do | do | $-OCH_3$ |
| 32 | do | $-Cl$ | do | do | do | Same as above. |
| 33 | do | $-Cl$ | do | do | $-CH_2CH_2OCHO$ | $-CH_2CH_2Cl$ |
| 34 | do | $-Br$ | do | do | Same as above | Same as above. |
| 35 | do | $-Br$ | $-CH_2CH_3$ | do | do | Do. |
| 36 | do | $-Cl$ | Same | do | do | Do. |
| 37 | do | $-Cl$ | do | do | do | $-CH_2CN$ |
| 38 | do | $-Cl$ | $-CH_3$ | do | do | Same as above. |
| 39 | do | $-Br$ | Same | do | do | Do. |
| 40 | do | $-Br$ | $-CH_2CH_3$ | do | do | Do. |
| 41 | $-CN$ | $-Br$ | Same | do | do | Do. |
| 42 | $-CN$ | $-Cl$ | do | do | do | Do. |
| 43 | $-CN$ | $-Cl$ | $-CH_3$ | do | do | Do. |
| 44 | $-CN$ | $-Br$ | Same | do | do | Do. |

| Example No. | X | Y | R₁ | R₂ | R₃ | R₅ |
|---|---|---|---|---|---|---|
| 45 | —CN | —Br | do | do | do | —CH₃ |
| 46 | —CN | —Cl | do | do | do | Same as above. |
| 47 | —CN | —Cl | —CH₂CH₃ | do | do | Do. |
| 48 | —CN | —Br | Same | do | do | Do. |
| 49 | —CN | —Br | do | do | do | H |
| 50 | —CN | —Cl | do | do | do | H |
| 51 | —CN | —Cl | —CH₃ | do | do | H |
| 52 | —CN | —Cl | —CH₂CH₃ | do | —CH₃ | H |
| 53 | —CN | —Cl | Same | do | —C₂H₅ | H |
| 54 | —CN | —Cl | do | do | —C₃H₇ | H |
| 55 | —CN | —Cl | do | do | —C₄H₉ | H |
| 56 | —CN | —Br | —C₂H₅ | —CH₂—CH—CH₃<br>　　　　ÓCHO | —CH₂—CH—CH₃<br>　　　　ÓCHO | |
| 57 | —CN | —Cl | Same | Same as above | Same as above | —CH₃ |
| 58 | —CN | —Br | do | do | do | Same as above. |
| 59 | —NO₂ | —Br | do | do | do | Do. |
| 60 | Same | —Cl | do | do | do | Do. |
| 61 | do | —Cl | do | do | do | H |
| 62 | do | —Cl | do | do | do | —OCH₃ |
| 63 | do | Br | do | do | do | H |
| 64 | do | Br | do | —CH₂CHCH₂Cl<br>　　ÓCHO | —CH₂CHCH₂Cl<br>　　ÓCHO | H |
| 65 | do | Br | —CH₂CH₃ | Same as above | Same as above | —CH₃ |
| 66 | do | Br | Same | —CH₂CHCH₂CN<br>　　ÓCHO | —CH₂CHCH₂CN<br>　　ÓCHO | Same as above. |
| 67 | do | Br | do | Same as above | Same as above | H |
| 68 | do | —Cl | do | do | do | —CH₃ |
| 69 | do | —Br | do | do | —CH₂CH₂COOCH₃ | H |
| 70 | do | Br | do | do | Same as above | —CH₃ |
| 71 | do | —Br | do | do | do | —CH₂CN |
| 72 | do | —Cl | do | do | do | Same as above. |
| 73 | do | —Cl | do | do | do | H |
| 74 | —CN | —Cl | do | do | do | H |
| 75 | —CN | —Cl | do | —CH₂CHCH₂Cl<br>　　ÓCHO | do | —CH₃ |
| 76 | —CN | —Br | do | Same as above | do | —CH(CH₃)₂ |
| 77 | —CN | —Br | do | do | do | H |
| 78 | —NO₂ | —Br | do | —CH₂CHCH₂CN<br>　　ÓCHO | do | —CH₃ |
| 79 | Same | —Br | do | Same as above | —CH₂CH₂COOCH₂CH₂OCH₃ | Same as above. |
| 80 | do | —Br | do | —CH₂CH₂CH₂OCHO | —CH₂CH₂CH₂OCHO | Do. |
| 81 | do | —Br | —CH₃ | Same as above | Same as above | Do. |
| 82 | do | —Br | Same | do | do | H |
| 83 | do | —Br | —CH₂CH₃ | do | do | H |
| 84 | do | —Cl | Same | do | do | H |
| 85 | —CN | —Br | do | do | do | H |
| 86 | —NO₂ | —Br | do | do | —CH₂CH₂CN | —CH₃ |
| 87 | Same | —Br | do | do | Same as above | H |
| 88 | do | —Cl | do | do | do | —CH₃ |
| 89 | do | —Br | do | —CH₂CHCH₃<br>　　ÓCHO | do | Same as above. |
| 90 | do | —Cl | —CH₃ | Same as above | do | H |
| 91 | do | —Cl | —CH₂CH₃ | —CH₂CHCH₂OCHO<br>　　　ÓCHO | do | CH₃ |
| 92 | do | —Cl | Same | Same as above | do | H |
| 93 | do | —Cl | do | do | do | —OCH₃ |
| 94 | do | —Br | do | do | —CH₂CHCH₃<br>　　ĆN | —CH₃ |
| 95 | do | Br | do | —CH₂CH₂OCHO | Same as above | Same as above. |
| 96 | do | —Cl | do | Same as above | do | H |
| 97 | do | Br | do | —CH₂CHCH₃<br>　　ÓCHO | do | —CH₃ |
| 98 | do | Br | do | Same as above | do | —CH₃ |
| 99 | do | Br | do | —CH₂CHCH₂Cl<br>　　ÓCHO | do | Same as above. |
| 100 | do | Br | —CH₃ | Same as above | do | H |
| 101 | do | Br | Same | —CH₂CH₂CH₂OCHO | —CH₂CH₂CH₂OCHO | H |
| 102 | do | Br | —CH₂CH₃ | Same as above | Same as above | —CH₃ |
| 103 | do | —Cl | Same | do | do | Same as above. |
| 104 | do | —Br | do | do | —CH₂CH₂COOCH₃ | —OCH₂CH₃ |
| 105 | do | —Br | do | do | Same as above | Same as above. |
| 106 | do | —Br | do | do | Same as above | —CH₃ |
| 107 | —CN | —NO₂ | do | —CH₂CH₂OCHO | —CH₂CH₂OCHO | Same as above. |
| 108 | —CN | Same | do | Same as above | Same as above | H |
| 109 | —CN | do | do | do | —CH₂CH₂CN | —CH₃ |
| 110 | —NO₂ | —Cl | do | —CH₂—CH—CH₂Br<br>　　　ÓCHO | —CH₂—CH—CH₂Br<br>　　　ÓCHO | H |
| 111 | —CN | —Br | do | —CH₂—CH—CH₂OCHO<br>　　　ÓCHO | —CH₂CH₃ | —CH₃ |
| 112 | —NO₂ | —NO₂ | do | —CH₂CH₂OCHO | —CH₂CH₂CN | Same as above. |
| 113 | —CN | —Br | do | Same as above | Same as above | —CH₂CH₂Br |
| 114 | —CN | —Br | do | do | do | —CH₂Cl |

| Example No. | X | Y | R₁ | R₂ | R₃ | R₄ |
|---|---|---|---|---|---|---|
| 115 | —CN | —Br | do | do | do | —CH₂CH₂Br |
| 116 | —CN | —Br | do | do | do | —CH—CH₃<br>\|<br>Cl |
| 117 | —CN | —Br | do | do | do | —CH—CH₂Cl<br>\|<br>Cl |
| 118 | —CN | —Br | do | do | do | —CH₂OCH₃ |
| 119 | —CN | —Br | do | do | do | —CH₂OC₆H₅ |
| 120 | —CN | —Br | do | do | do | —CH₂COCH₃ |
| 121 | —CN | —Br | do | do | do | —CH₂COC₆H₅ |
| 122 | —CN | —Br | do | do | do | —CHBrCH₂Br |
| 123 | —CN | —Br | do | do | do | —CH₂Br |
| 124 | —NO₂ | —Br | do | do | do | —CH₃ |
| 125 | —CN | —Cl | do | do | do | H |
| 126 | —CN | —Br | do | do | do | H |
| 127 | —CN | —Br | do | do | do | CH₃ |

Formulae of representative dyes of the foregoing examples are as follows:

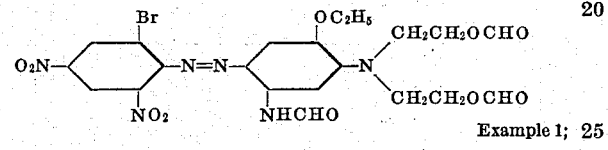
Example 1;

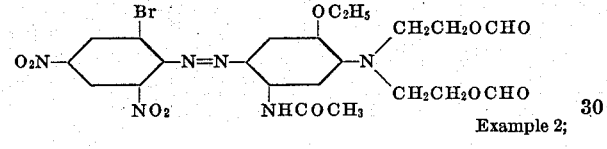
Example 2;

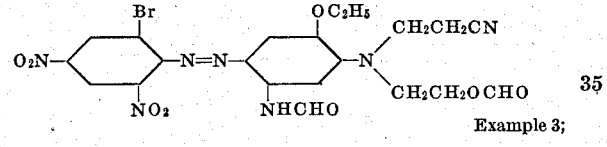
Example 3;

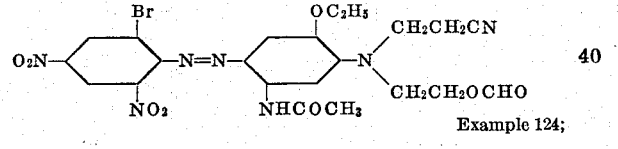
Example 124;

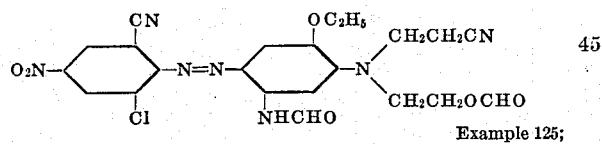
Example 125;

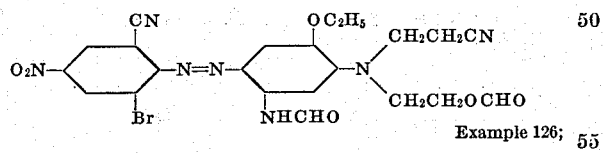
Example 126;

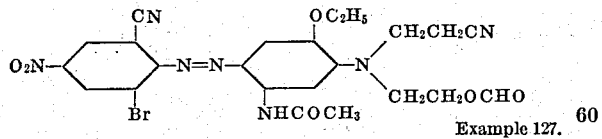
Example 127.

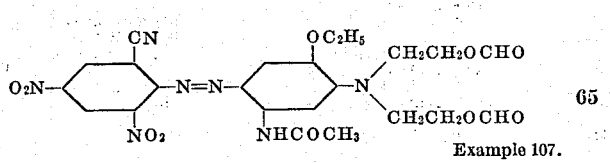
Example 107.

Having thus disclosed the invention, what we claim is:

1. Dye of the formula

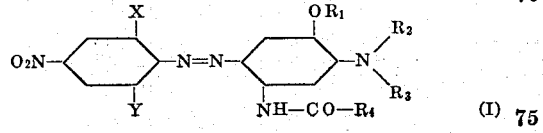

wherein:

X is nitro or cyano;
Y is chloro, bromo or nitro;
R₁ is methyl or ethyl;
R₂ is β-formyloxyethyl, β-formyloxypropyl, γ-formyloxypropyl, β,γ-diformyloxypropyl, β-formyloxy-γ-chloropropyl, β-formyloxy-γ-bromopropyl or β-formyloxy-γ-cyanopropyl;
R₃ is methyl, ethyl, propyl, butyl, cyanalkyl, alkoxycarbonylalkyl or one of the meanings of R, each alkyl and alkoxy containing 1, 2, 3, or 4 carbon atoms; and
R₄ is a hydrogen atom, alkyl or alkoxy; each alkyl and alkoxy containing 1, 2, 3, or 4 carbon atoms and any substituent thereon being a non-water-solubilizing substituent selected from the group consisting of chloro, bromo, cyano, methoxy, ethoxy, phenoxy, phenyl, acetyl and benzoyl.

2. A dye according to claim 1 of the formula

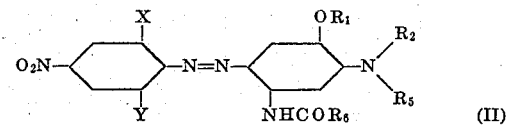

where X stands for a nitro or cyano group, Y for a chlorine or bromine atom or the nitro group, R₁ for a methyl or ethyl radical, R₂ for a β-formyloxyethyl, β- or γ-formyloxypropyl, β,γ-diformyloxypropyl, β-formyloxy-γ-chloropropyl, β-formyloxy-γ-bromopropyl or β-formyloxy-γ-cyanopropyl radical, R₅ stands for an unsubstituted alkyl group having 1, 2, 3 or 4 carbon atoms, or a β-cyanethyl, β-cyanopropyl, β-methoxycarbonylethyl or β-(β'-methoxyethoxycarbonyl)-ethyl radical or for one of the meanings of R₂, and R₆ for a hydrogen atom, or a methyl, ethyl, propyl, methoxy, ethoxy, chloromethyl, chloroethyl, bromomethyl, bromoethyl, dichloroethyl, dibromoethyl, cyanomethyl, phenoxymethyl, β-chloroethoxy, β-bromoethoxy, benzyloxy, methoxymethyl, ethoxymethyl, acetylmethyl or benzoylmethyl group.

3. The dye according to claim 1 of the formula

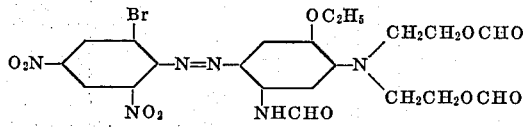

4. The dye according to claim 1 of the formula

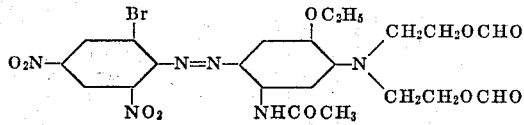

5. The dye according to claim 1 of the formula

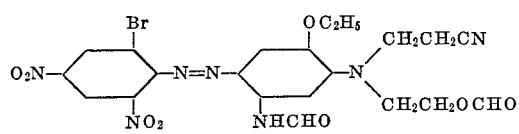

6. The dye according to claim 1 of the formula

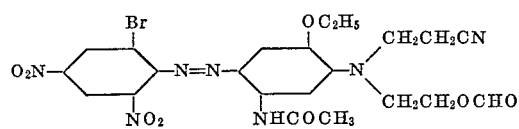

7. The dye according to claim 1 of the formula

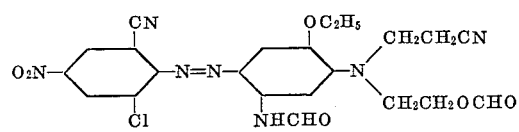

8. The dye according to claim 1 of the formula

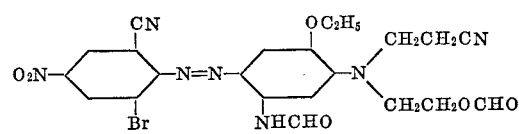

9. The dye according to claim 1 of the formula

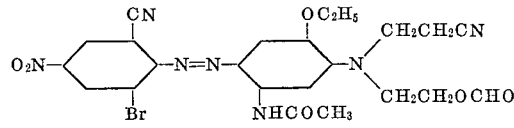

10. The dye according to claim 1 of the formula

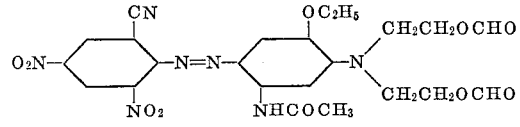

References Cited
UNITED STATES PATENTS

| | | | |
|---|---|---|---|
| 2,323,314 | 7/1943 | Dickey et al. | 260—207.1X |
| 2,336,275 | 12/1943 | McNalley et al. | 260—207X |
| 3,117,830 | 1/1964 | Lange et al. | 260—207.1X |
| 3,178,405 | 4/1965 | Merian et al. | 260—207 |

FOREIGN PATENTS

| | | | |
|---|---|---|---|
| 343,560 | 2/1960 | Switzerland | 260—207 |
| 627,487 | 5/1963 | Belgium | 260—207.1 |

JOSEPH P. BRUST, Primary Examiner

C. F. WARREN, Assistant Examiner

U.S. Cl. X.R.

260—465, 471, 478; 8—41, 50

UNITED STATES PATENT OFFICE
CERTIFICATE OF CORRECTION

Patent No. 3,544,549    Dated  July 31, 1967

Inventor(s)  RUEDI ALTERMATT et al

It is certified that error appears in the above-identified patent and that said Letters Patent are hereby corrected as shown below:

Column 1, line 52, in the formula "$R_3$" should read --$R_5$--. Column 2, line "filters" should read --fillers--. Column 3, Example 14, the definition of should read --do--. Column 4, Example 8, in the definition of $R_3$, "d" should read --do--. Column 5, Example 50, "CH" should read --CN--. Column 6, in heading of the last column, "$R_5$" should read --$R_4$--. Column 8, line 28, "I should read --$R_2$,--.

Signed and sealed this 18th day of July 1972.

(SEAL)
Attest:

EDWARD M. FLETCHER, JR.    ROBERT GOTTSCHALK
Attesting Officer    Commissioner of Patents